(12) United States Patent
Pearcy et al.

(10) Patent No.: US 10,769,276 B2
(45) Date of Patent: Sep. 8, 2020

(54) ADVANCED THREAT PROTECTION CROSS-PRODUCT SECURITY CONTROLLER

(71) Applicant: McAfee, LLC, Santa Clara, CA (US)

(72) Inventors: Derek Pearcy, San Francisco, CA (US); Jessica Heinrich, Tacoma, WA (US); Michael Bishop, Aylesbury (GB); Cristian Fiorentino, Cordoba (AR); Jessica Gaskins, Boulder Creek, CA (US); Martina Borkowsky, Aylesbury (GB)

(73) Assignee: McAfee, LLC, Santa Clara, CA (US)

( * ) Notice: Subject to any disclaimer, the term of this patent is extended or adjusted under 35 U.S.C. 154(b) by 47 days.

(21) Appl. No.: 16/133,485

(22) Filed: Sep. 17, 2018

(65) Prior Publication Data

US 2019/0018957 A1    Jan. 17, 2019

Related U.S. Application Data

(63) Continuation of application No. 14/757,782, filed on Dec. 23, 2015, now Pat. No. 10,078,753.
(Continued)

(51) Int. Cl.
*G06F 21/56* (2013.01)
*G06F 21/55* (2013.01)
(Continued)

(52) U.S. Cl.
CPC .......... *G06F 21/562* (2013.01); *G06F 21/552* (2013.01); *G06F 21/577* (2013.01); *H04L 63/1425* (2013.01)

(58) Field of Classification Search
None
See application file for complete search history.

(56) References Cited

U.S. PATENT DOCUMENTS 7,818,343 B1 * 10/2010 Sekhar ................... G06Q 10/10
                                                    707/781
8,112,799 B1 *  2/2012 Loiodice ................ G06F 21/51
                                                    709/223
(Continued)

FOREIGN PATENT DOCUMENTS

JP          2015116694          8/2015

OTHER PUBLICATIONS

International Preliminary Report on Patentability dated Apr. 24, 2018 in International Patent Application No. PCT/US2016/052826.
(Continued)

*Primary Examiner* — William J. Goodchild
(74) *Attorney, Agent, or Firm* — Byrne Poh LLP

(57) ABSTRACT

A system for securing electronic devices includes a processor, non-transitory machine readable storage medium communicatively coupled to the processor, security applications, and a security controller. The security controller includes computer-executable instructions on the medium that are readable by the processor. The security application is configured to determine a suspicious file from a client using the security applications, identify whether the suspicious file has been encountered by other clients using the security applications, calculate a time range for which the suspicious file has been present on the clients, determine resources accessed by the suspicious file during the time range, and create a visualization of the suspicious file, a relationship between the suspicious file and the clients, the time range, and the resources accessed by the suspicious file during the time range.

14 Claims, 17 Drawing Sheets

Related U.S. Application Data

(60) Provisional application No. 62/245,131, filed on Oct. 22, 2015.

(51) Int. Cl.
  G06F 21/57 (2013.01)
  H04L 29/06 (2006.01)

(56) References Cited

U.S. PATENT DOCUMENTS

| | | | |
|---|---|---|---|
| 8,776,240 B1* | 7/2014 | Wu | G06F 21/567 |
| | | | 726/22 |
| 2004/0059720 A1* | 3/2004 | Rodriguez | G06F 16/438 |
| 2008/0086773 A1* | 4/2008 | Tuvell | G06F 21/56 |
| | | | 726/23 |
| 2010/0125912 A1 | 5/2010 | Greenshpon et al. | |
| 2011/0191849 A1* | 8/2011 | Jayaraman | H04L 67/2814 |
| | | | 726/23 |
| 2015/0244730 A1 | 8/2015 | Vu et al. | |

OTHER PUBLICATIONS

International Search Report and Written Opinion dated Dec. 22, 2016 in International Patent Application No. PCT/US2016/052826.
McMillen, David, "Indicators of Compromise", In IBM Security Services Research Report, Jun. 2015, pp. 1-8.
Notice of Allowance dated May 9, 2018 in U.S. Appl. No. 14/757,782.
Office Action dated Apr. 13, 2017 in U.S. Appl. No. 14/757,782.
Office Action dated Jul. 24, 2017 in U.S. Appl. No. 14/757,782.

* cited by examiner

FIG. 8

To investigate: Malicious Files 0 | Suspicious Files 3 | Files Blocked 9K | Files Passed 173K | Hosts Protected 120K | Hosts Quarantined 203

Previous 72 hours ▼   Peter Quill ▼

802, 804, 806, 808, 810

79 Malware files — 812
16 Sources by domain — 814
142 Targets by host — 816, 818
820 ebd871dea9d8a847a9 — 806
MALICIOUS - BLOCKED

- Blocked by GTI — 6 Jul 07:04
- Categorized by GTI — Mar 2014
- First seen — 6 Jul 05:17
- Total seen — 2
- BLOCKED Name: windowsupdate52.exe
Source: intel.com
Type: acrobat.exe / Acrobat executable
Size: 71,680 bytes

- Response Log
- Other Names
- URLs Contacted
- Activities

Admin scans activity for the last 72 hours.

| | Source | | | |
|---|---|---|---|---|
| ca1b27658c3...0b033d4f33f | intel.com | 88 | ⊠ outlook.com | 52 | ⊕ Felipe Rodriguez | Clean |
| e9b91b8bc090...ae47c0379f1 | facebook.com | 9 | ⊕ yahoo.com | 36 | ⊠ Robert Santos | Clean |
| 3e0f74317f93d...4f33f437f93d | facebook.com | 5 | ⊠ mail.com | 9 | ⊕ Sam Wheeler | Clean |
| | | | ⊠ rocketmail.com | 5 | | |
| 8d498355a25e...8bc090ac03 | facebook.com | 9 | ⊕ gmail.com | 5 | ⊠ Kimberly Harrison | Clean |
| cd7fec5998c2...4960e924831 | contractor.com | 5 | ⊠ facebook.com | 3 | ⊕ Kris Paterson | Clean |
| f9b91b8bc090ae47-c0379 | USB | 3 | ⊕ intelinfo.freesite.bz | 2 | ⊕ Sandy Wheeler | Clean |
| d343eksh3qhd...2ohisdkhgrka | \\SHAREMGMT\Q3 | 2 | 🖬 USB | 1 | ⊕ Tim Kilpatrick | Clean |
| bea2cece1fb1...0b1d0ae9034 | freeware.com | 1 | 🖬 \\SHAREMGMT\Q3 | 1 | ⊠ Paty Wilson | Clean |
| ebd871dea9d8a847a9 | | 1 | ⊕ intel.com | 1 | | |
| cd7fec5998c24...960e924be1 | | 1 | ⊕ freeware.com | 1 | | |
| bea2cece1fb1...0b1d0ae9034 | | 1 | | | Clean All | |

From Fri, 4 Jul 07:15 — Sat | Sun | Mon

| Date | Source | File Name | Target | MD5 Hash | Status |
|---|---|---|---|---|---|
| 6 Jul 07:04 | intel.com | windowsupdate52.exe | Melissa Koch | ebd871dea9d8a847a9 | BLOCKED |
| 6 Jul 06:23 | facebook.com | cmd.exe | Lisa Washington | f9b91b8bc090ae47c0379 | BLOCKED |
| 6 Jul 06:23 | facebook.com | cmd.exe | Paty Howell | f9b91b8bc090ae47c0379 | BLOCKED |
| 6 Jul 06:05 | facebook.com | cmd.exe | Janet Owen | f9b91b8bc090ae47c0379 | |
| 6 Jul 06:05 | contractor.com | vtest_doc.doc | Melinda Tompkins | 9034ebd8716cbc090aea9d8a847a9 | |
| 6 Jul 05:21 | USB | bill39C6113.scr | Nick Montgomery | bea2cece1fb1d1ac00b1d0ae4 | |
| 6 Jul 05:17 | \\SHAREMGMT\Q3 | windowsupdate52.exe | Aaron Burman | ebd871dea9d8a847a9 | |
| 6 Jul 04:53 | freeware.com | fashioncrest_ltd.doc | Chris Rowe | 622kjbd871debc090aea9d | BLOCKED |

To investigate: 2 Malware files | Malicious Files: 0 | Suspicious Files: 3 | Files Blocked: 9K | Files Passed: 173K | Hosts Protected: 120K | Hosts Quarantined: 203 | Previous 72 hours | Peter Quill

*812* ca1b27658c3...0b033d4f33f — 85
*822* 4f33f43793d0e...0f74317793d — 5 ca1b27658c3...0b033d4f33f URLs — SUSPICIOUS — *806*

- ☒ Event date — 6 Jul 06:04
- ○ Evaluated by ATP — 5 Jul 18:47
- ○ First seen — 5 Jul 18:31
- □ Total seen — 88

Block, File, URLs & Clean ▼

| | | |
|---|---|---|
| Name | vtest.doc.doc | |
| Source | outlook.com | |
| Type | word.doc — Microsoft Word 2007 | |
| Size | 13,294 bytes | |

- ▶ Response Log
- ▼ Other Names — *1102* — ○ 3
- ▼ URLs Contacted — ○ 7
  - ○ molin0derrec.net
  - ○ a29.d.akamai.com
  - ○ gstatic1.net
- ▶ Activities Time to take action... block the file and URLs.

View scan report

3 Sources by domain — *814*

| | | 7 related URLs |
|---|---|---|
| ☒ outlook.com | 52 | ○ molin0derrec.net — Block URL ▼ |
| ⊕ yahoo.com | 36 | ○ a29.d.akamai.com — Block URL ▼ |
| ⊕ freedownloads.com | 5 | ○ gstatic1.net *818* — Block URL ▼ |
| | | ○ lb2.www.ms.akados.com — (seen 9 days ago) BLOCKED |
| | | ○ 3apa3a.tomsk.tw — (seen 9 days ago) BLOCKED |
| | | ○ antivirusvs.ru — (seen 9 days ago) BLOCKED |
| | | ○ download.fistclick.co.kr — (seen 9 days ago) BLOCKED |

From Fri, 4 Jul 07:15 | Sat | Sun | Mon | Block URLs ▼ *820*

| Date ▼ | Source | Target | File Name | MD5 Hash | Status |
|---|---|---|---|---|---|
| ☒ 6 Jul 06:04 | outlook.com | Janet Owen | vtest_doc.doc | ca1b27658c3c033ef0b033d4f33f | SUSPICIOUS |
| ☒ 6 Jul 05:23 | outlook.com | Chris Rowe | vtest_doc.doc | ca1b27658c3c033ef0b033d4f33f | SUSPICIOUS |
| ☒ 6 Jul 05:23 | outlook.com | Melinda Tompkins | vtest_doc.doc | ca1b27658c3c033ef0b033d4f33f | SUSPICIOUS |
| ☒ 6 Jul 05:05 | yahoo.com | Janet Owen | vtest_doc.doc | ca1b27658c3c033ef0b033d4f33f | |
| ⊕ 6 Jul 05:21 | yahoo.com | Lisa Washington | vtest_doc.doc | ca1b27658c3c033ef0b033d4f33f | |
| ☒ 6 Jul 05:17 | outlook.com | Natalie Howell | vtest_doc.doc | ca1b27658c3c033ef0b033d4f33f | |
| ⊕ 6 Jul 04:53 | yahoo.com | Melissa Koch | vtest_doc.doc | ca1b27658c3c033ef0b033d4f33f | SUSPICIOUS |
| | | Chris Rowe | | | |

FIG. 16

ADVANCED THREAT PROTECTION CROSS-PRODUCT SECURITY CONTROLLER

CROSS-REFERENCE TO RELATED APPLICATIONS

This application is a continuation of U.S. patent application Ser. No. 14/757,782, filed on Dec. 23, 2015, which claims the benefit of U.S. Provisional Application No. 62/245,131, filed on Oct. 22, 2015, each of which is hereby incorporated by reference herein its entirety.

TECHNICAL FIELD

The present invention relates generally to electronic device security and, more particularly, to an advanced threat protection cross-product security controller.

BACKGROUND

Traditional anti-virus and anti-malware solutions, besides being reactive in nature, are unable to cope with the exponential growth in malware attacks. Malware attacks are becoming more sophisticated and easily capable of subverting current solutions. Target attacks may be silent in nature and infect fewer machines, thus decreasing the odds that solution providers will see the particular attacks. Anti-malware solutions address single vectors of attack or single sets of data.

BRIEF DESCRIPTION OF THE DRAWINGS

FIGS. 8-16 are illustrations of operation of an example graphical interface for a controller, according to embodiments of the present disclosure.

DETAILED DESCRIPTION OF EMBODIMENTS OF THE INVENTION

Figure 1:
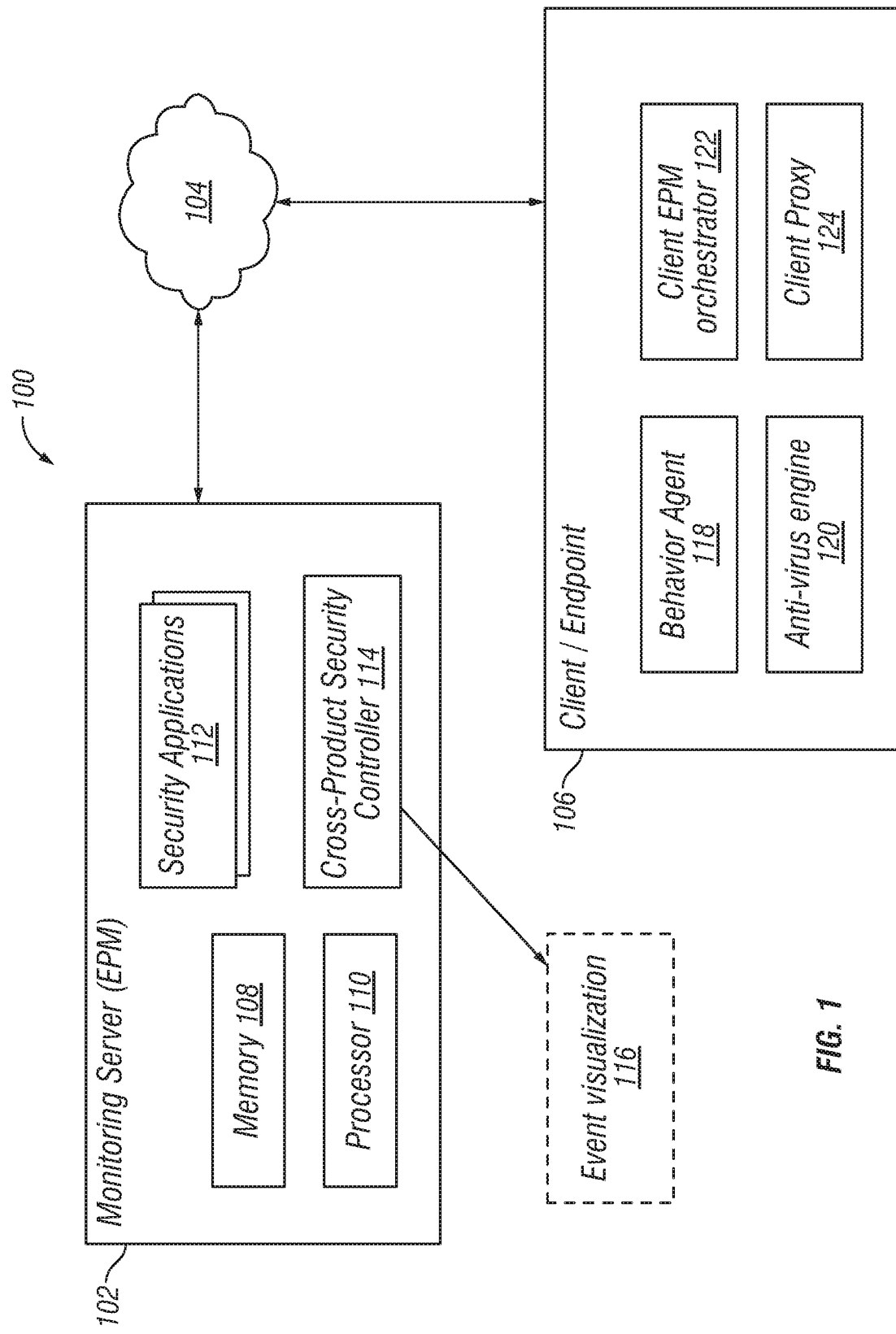
FIG. 1 is an example embodiment of a system for an advanced threat protection cross-product security controller 114, according to embodiments of the present disclosure.

FIG. 1 is an example embodiment of a system 100 for an advanced threat protection cross-product security controller 114, according to embodiments of the present disclosure. Controller 114 may integrate a set of security products, such as security applications 112. The results of one aspect of security applications 112 may be fed to other ones of security applications so as to generate a set of contexts. Different sets of related contexts may be aggregated, indexed, summarized, pivoted, and selectively presented by controller 114 to users of system 100. The sets of contexts may be centered around incidents of suspicious activity. The contexts may lead to remediation workflows, such as cleaning or quarantining hosts for incident resolution and policy generation in support of defining automatic, subsequent actions.

Controller 114 may be implemented in any suitable portion of system 100. For example, controller 114 may be implemented in a monitoring server 102. The monitoring server 102 may include an endpoint management (EPM) server. The EPM server may include a McAfee ePolicy Orchestrator server. Controller 114 may monitor operations of various portions of a network 104 or cloud. Such a cloud may include a public or private cloud. Furthermore, controller 114 may monitor one or more clients 106 or endpoints in network 104. Although a single client is shown, any suitable number or kind of clients may be used. Monitoring server 102 may be implemented by, for example, a computer, blade server, mainframe, or other suitable electronic device. Clients 106 may be implemented by, for example, a computer, virtual machine, thin client, laptop, mobile device, tablet, or other suitable electronic device. Network 104 may be implemented by a public cloud, private cloud, intranet, private network, WLAN, LAN, VLAN, or other suitable networked configuration of electronic devices. Controller 114 may be implemented by, for example, a module, executable, script, application, function, application programming interface, code, or other suitable entity. Although a single controller 114 is shown, controller 114 may be implemented by multiple such entities in communication with each other. Controller 114 may be implemented by instructions in a memory 108 for execution by a processor 110. The instructions, when loaded and executed by processor 110, may perform the functionality of controller 114 described in this disclosure.

In one embodiment, controller 114 may aggregate, summarize, or otherwise collect information from one or more security applications 112, which may be running on the same server as controller 114, a different server, or clients. Security applications 112 may include, for example, email scanners, intrusion protection systems, firewalls, web scanners, behavior analysis applications, firewall, Next Generation Firewall (NGFW), active response (AR), threat intelligence exchange (TIE), data loss prevention (DLP), EPO, EPM, threat-intelligence platforms, endpoint query and triggering systems, advanced threat detection (ATD), endpoint management servers, advanced threat protection (ATP), pattern-matching, or security incident event management (SIEM). Any one of the security applications 112 may generate an indicator of compromise (IoC), which may indicate a characteristic associated with a malware threat. These may include, for example, a file hash, URL, or network address. Advanced threat detection, through techniques such as sand-boxing, fingerprinting, static analysis, can identify patterns of behavior for a specific executable across a range of possible environments and assign a measure of severity to a given piece of executable code. Such code may be later be evaluated as a point of criteria in triggering automatic or manual investigation, ATP may evaluate files and, if they are suspicious, yield a file hash or signature. Active response may ping clients to determine whether any of the clients have found a given suspicious file based upon a hash. Corresponding applications on the clients may report how long the file has been there, file names, hosts from which the file was received, whether it was executed, or other information. The active response results may be used to further query other hosts for information from the time the file was found to see if the file made any other connections and discover a vector through which it arrived. URLs may be analyzed for a pattern of web traffic and to determine whether any high-risk activities were performed, such as accessing malicious websites or performing suspicious behavior. STEM may capture data from other security applications. TIE may be a local version of a global threat intelligence exchange, and may identify attack paths and past interactions with known bad actors associated with botnets, distributed denial-of-service (DDoS), mail- and spam-sending malware that hosts network probing, malware presence, DNS hosting, and activity generated by intrusion attacks. DLP may identify patterns of data exposure. DLP may further categorize data according to the contents or meta-information of data. For example, DLP may scan data and find presentation slides marked as "confidential" and raise an indicator or quantification of the sensitivity of the data. Intrusion protection systems may identify network or other inbound traffic, determine patterns or characteristics of the behavior, and determine that the inbound traffic is an intrusion and is malicious. EPM software may provide console information to an administrator of system 100. Active Response, whether installed in a server or locally on clients, may mine clients for information about indicators of attack or other triggers that signify malware.

In another embodiment, controller 114 may generate an event visualization 116 based upon security settings and information obtained from security applications 112. The event visualization may be presented within a unified software graphical user interface (GUI). Event visualization 116 may illustrate combinations of results from security applications 112. In one embodiment, controller 114 may provide an event visualization of configuration of various aspects of network 104 or clients 106.

In yet another embodiment, any suitable software may be operating on clients 106 for gathering information to be used by controller 114. For example, client 106 may include a behavior agent 118 for tracking the behavior of applications, software, or inbound or outbound traffic of client 106. Client 106 may include a client EPM orchestrator 122, which may handle communication and coordination with EPM software on server 102. Client 106 may include a client proxy 124 to automatically redirect a range of network connections through a cloud-based proxy service. This may be performed regardless of the network through which the client is connecting. Client 106 may also include any suitable number of security applications, such as an anti-virus engine 120. Client 106 may be implemented by a virtual machine, computer, tablet, blade, mobile phone, laptop, or other suitable electronic device. Client 106 may include a processor and memory to store, load, and execute the elements contained therein.

In one embodiment, controller 114 may determine which of clients 106 have recently executed code which exhibits a given suspicious activity. In a further embodiment, controller 114 may determine what set or sets of other suspicious activities that those same clients 106 experienced. In another embodiment, controller 114 may determine what sources delivered any related suspicious payloads to the respective client. In yet another embodiment, controller 114 may determine what other activities have been performed by those sources. In another embodiment, controller 114 may specify how these can be cleaned and their suspicious activity may be blocked.

Event visualization 116 may illustrate endpoint behavioral data acquired from clients 106 from external inspection of activity, such as results from firewalls, intrusion protection system (IPS), or other switch or flow-based monitors. Event visualization 116 may map these to executable behavior, such as the output of sandbox analysis, or on-client 106 software security applications. An original vector of a suspicious executable's entrance to the network as well as showing how a suspect client 106 had behaved on either side of a suspicious executable being introduced into the environment may be shown. Furthermore, these may be illustrated in a unitary GUI display.

Event visualization 116 may illustrate unusual results exposed from a complex set of interrelationships between clients 106, the applications that clients 106 have executed, the behaviors of those applications or files, and observed behaviors before and after an incident.

Portions of system 100 may be implemented in any suitable manner, such as by a program, application, script, function, library, code, software, firmware, hardware, or other mechanisms for carrying out the functionality described herein. Various portions of system 100 may include a processor communicatively coupled to a memory. The functionality of portions of system 100 may be performed by loading instructions from the memory into the processor and executing the instructions, wherein the instructions configure the various portions of system 100 to perform the functionality of this disclosure. Moreover, although certain portions of system 100 are described as performing certain functionality, other suitable portions of system 100 may carry out such functionality.

The memories may be in the form of physical memory or pages of virtualized memory. The processors may comprise, for example, a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in memory. Memory may be configured in part or whole as application memory, system memory, or both. Memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of the system may reside in memory for execution by the processor.

The processor may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, micro-instructions, or control signals which reflect the original code instruction. The processor may also include register renaming logic and scheduling logic, which generally allocate resources and queue the operation corresponding to the convert instruction for execution. After completion of execution of the operations specified by the code instructions, back end logic within the processor may retire the instruction. In one embodiment, the processor may allow out of order execution but requires in order retirement of instructions. Retirement logic within the processor may take a variety of forms as known to those of skill in the art (e.g., re-order buffers or the like). The processor cores of the processor are thus transformed during execution of the code, at least in terms of the output generated by the decoder, the hardware registers and tables utilized by the register renaming logic, and any registers modified by the execution logic Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Methods may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

Figure 2:
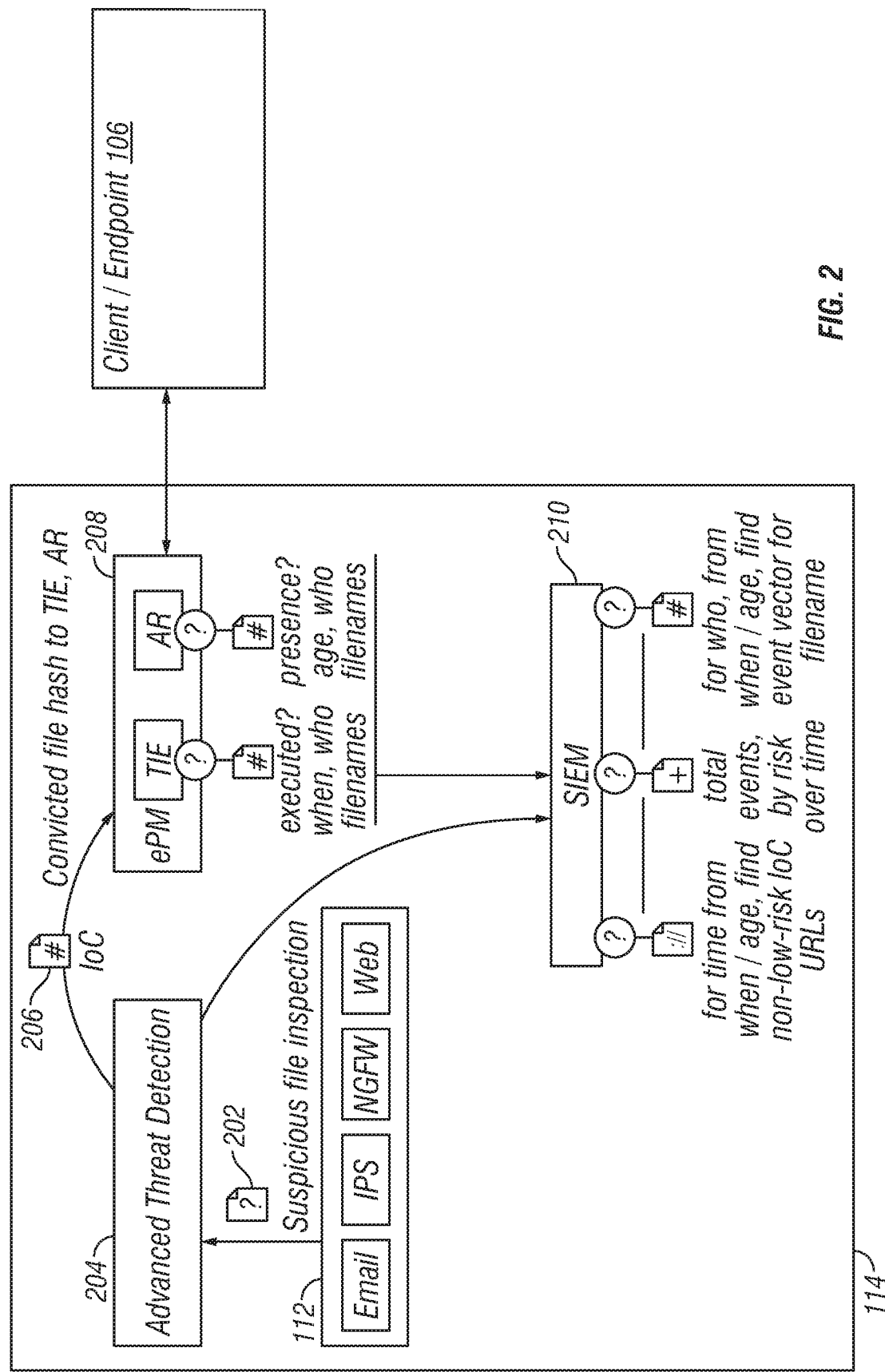
FIG. 2 is an illustration of example operation of the system, according to embodiments of the present disclosure.

FIG. 2 illustrates example operation of system 100, according to embodiments of the present disclosure. In particular, FIG. 2 illustrates example operation of controller 114 to obtain analysis from various security applications 112 and to use such analysis to cause further analysis from other ones of security applications 112.

For example, a suspicious file 202 may be inspected and identified as suspicious from a given security application 112. The security application 112 may include, for example, as e-mail scanning, IPS, firewalls, or web behavior monitors. Suspicious file 202 may be uniquely identified with a hash or digital signature by advanced threat detection logic 204 and noted as an IoC 206. File 202, or its unique identifier, may be routed by controller 114 to EPM 208 software, applications, or modules, such as TIE or active response. Furthermore, file 202, or its unique identifier, may be routed by controller 114 to SIEM 210.

The TIE and the active response security applications may determine whether file 202 was executed by any given client 106. Various clients 106 may be checked or queried. For example, clients 106 may be queried to see whether they include a file with the designated hash or signature value. If file 202 was executed, the time of the executions and the associated filenames may be determined. Furthermore, it may be determined whether file 202 is even present on any given client 106. If so, the age of file 202 and the associated filenames may be determined. The age of file 202 may include when it was first introduced to the respective client 106. The results of this analysis may be forwarded by controller 114 to SIEM 210.

Output from the TIE and active response queries of clients 106 may be used by controller 114 to perform additional queries through TIE and the active response security applications. Other clients that had communication with clients 106 regarding file 202 in question may in turn be queried for the relevant time period.

SIEM 210 or other suitable portions of system 100 may be configured to aggregate and determine, for given file hashes or other unique identification of a given file, and for the time from when file 202 was first determined to exist on the client or was introduced to the client (i.e., age), determine network activity that is suspicious. Such network activity may include, for example, evidence of URLs accessed by clients with the given file wherein the URLs are not low-risk, or are otherwise IoCs. Furthermore, SIEM 210 or other suitable portions of system 100 may identify total IoC events and their associated risk over the time period. In addition, SIEM 210 or other suitable portions of system 100 may find all transmissions of the given file to or from affected clients. The time of such transmissions and identities of the respective parties may be determined. An event vector may be created for the given file.

The series of steps described above and in the operation of the figures that follow may be performed in any suitable order and for any suitable combination of times. The steps may be performed as needed to properly integrate and enrich the event and system information through the most efficient path in order to arrive at a judgment about the relevance of a given resulting context.

Figure 3:
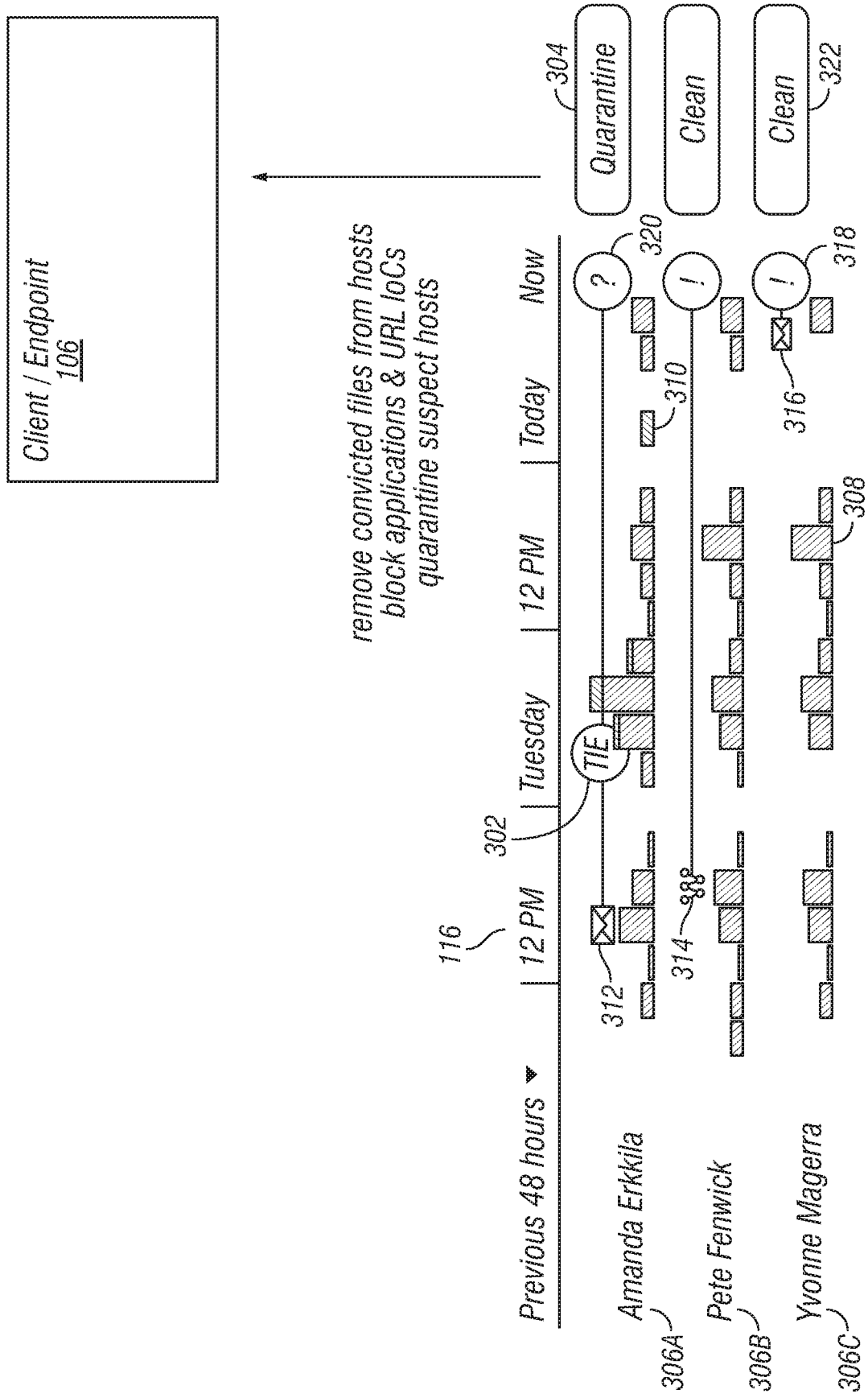
FIG. 3 illustrates further example operations that may be performed by the system, according to embodiments of the present disclosure.

FIG. 3 is a further illustration of example operation of system 100, according to embodiments of the present disclosure. In particular, FIG. 3 illustrates an instance of event visualization 116 generated by operation of controller 114. FIG. 3 also illustrates options to take remedial action for affected clients. The generation of event visualization 116 and remedial action may be taken as a result of the analysis shown in FIG. 2.

In one embodiment, visualization of IoC events and the data surrounding the event may be based upon users. In various embodiments, the visualization may be based upon client machines, client virtual machine instances, networks, sub-networks, applications, URLs, executables, or other suitable criteria. The visualization may include a suitable timeline. In the example of FIG. 3, each day is broken down into eight equal periods of time of three hours each. The timeline may include a first IoC event that triggered the analysis of the clients. Thus, the visualization may show how behavior has changed. The IoC event 302 may be labeled according to the element of system 100 that detected it.

Usage of a resource may be charted per user 306 or client in the visualization. The usage may include, for example, data traffic, execution workloads, data access, or any other suitable resource utilization. Activity 308 within a normal or expected range of operation may be denoted by a first color, such as green. Activity 310 extending beyond such a normal range of operation may be designated by various other colors to indicate different qualitative or quantitative evaluations, such as yellow for suspicious or red for malicious. For example, a given amount of network traffic occurring between midnight and 3 AM, although not large in absolute terms, is unexpected at that time of day and may be marked as yellow.

A first instance or occurrence of a file in question may be marked for each user. For example, the first user 306A may have received the file on Monday between noon and three P.M. A second user 306B may have received the file on Monday between three and six P.M. A third user 306C may have received the file on Wednesday between six and nine P.M.

In one embodiment, the manner in which each IoC was encountered may be displayed. For example, the first user 306A may have encountered the file by receipt of the file via e-mail. This may be shown by a letter icon 312, indicating SMTP. The second user 306B may have encountered the file by accessing via a web proxy, shown with a networking icon 314. The third user may have encountered the file by receipt via e-mail, shown with a letter icon 316.

In another embodiment, whether the file is still present on the client of the user may be displayed. For example, the first user might no longer have the file on the client device, and this status may be indicated by display of a question mark 318. The second user and the third user might still have the file, and this status may be indicated by a display of an exclamation mark 320.

In yet another embodiment, the trigger, sensor, or security application that detected the threat or IoC may be displayed. Furthermore, the time and client wherein the detection was made may be indicated. For example, if the TIE security application determined the presence of the IoC on the first user, a red dot 302 indicating "TIE" may be displayed on the first user's timeline at the appropriate time of detection.

In one embodiment, options to clean each user's client may be presented. The option best suited for a given client or user may be displayed. For example, for the first user 306A, wherein the file is no longer on the client, an option 304 to quarantine the client may be presented. For the second and third users 306B, 306C, wherein the file is still on the client, an option 322 to clean the client of the file may be presented.

The option selected for a given user may be applied to the corresponding client 306 or endpoint. For example, convicted files may be removed from clients. In another example, applications or URLs may be blocked or quarantined.

Figure 4:
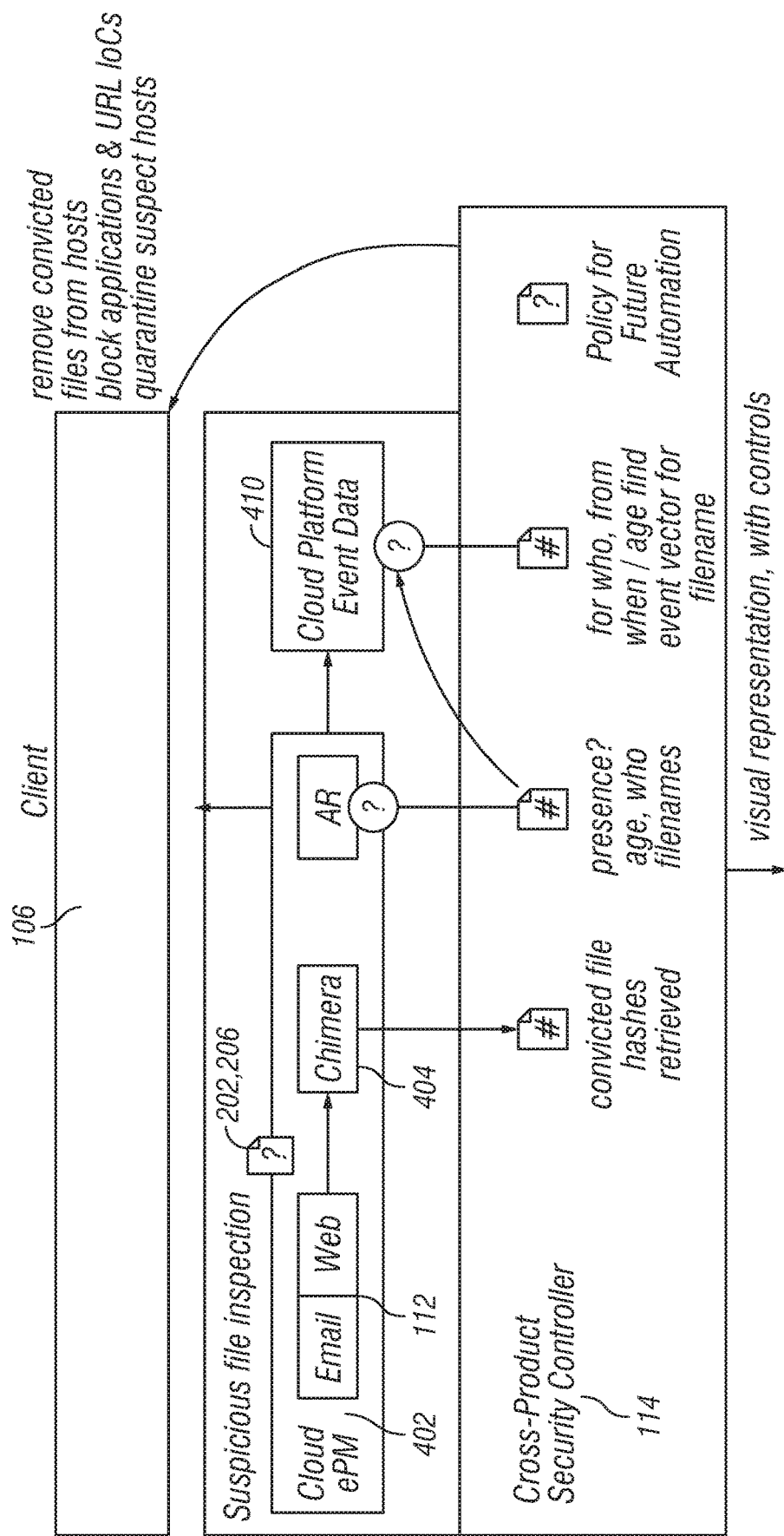
FIG. 4 is an illustration of operation of the controller, according to embodiments of the present disclosure.

FIG. 4 is an illustration of further operation of controller 114, according to embodiments of the present disclosure.

EPM software 402 in a cloud infrastructure may include security applications 112, such as email and web scanning. A given suspicious file may be matched using pattern matching software such as Chimera 404. The convicted file hashes of suspicious files may be received by controller 114. Controller 114 may be operating in a same or different portion of the cloud than security applications 112.

Controller 114 may access active response with queries to determine, for clients accessible to the active response application, whether given clients or endpoints have the file (as identified by a hash or signature), their ages, filenames, and other information. Controller 114 may cross-reference cloud platform event data 410 with results from these queries. Cloud platform event data 410 may specify operations on various platforms, indicating who, performed the operations, from where, when, and to what destinations or files. The cross-referencing may yield, for example, for what users or clients the file was obtained, time ranges of access or download, and other event vectors for the file. A policy may be generated for future automation. The policy may specify, for example, that the file is to be quarantined or deleted. The policy may be propagated to clients or endpoints. Furthermore, the file might be removed from clients, applications associated with the file blocked, and URL IoCs blocked.

Figure 5:
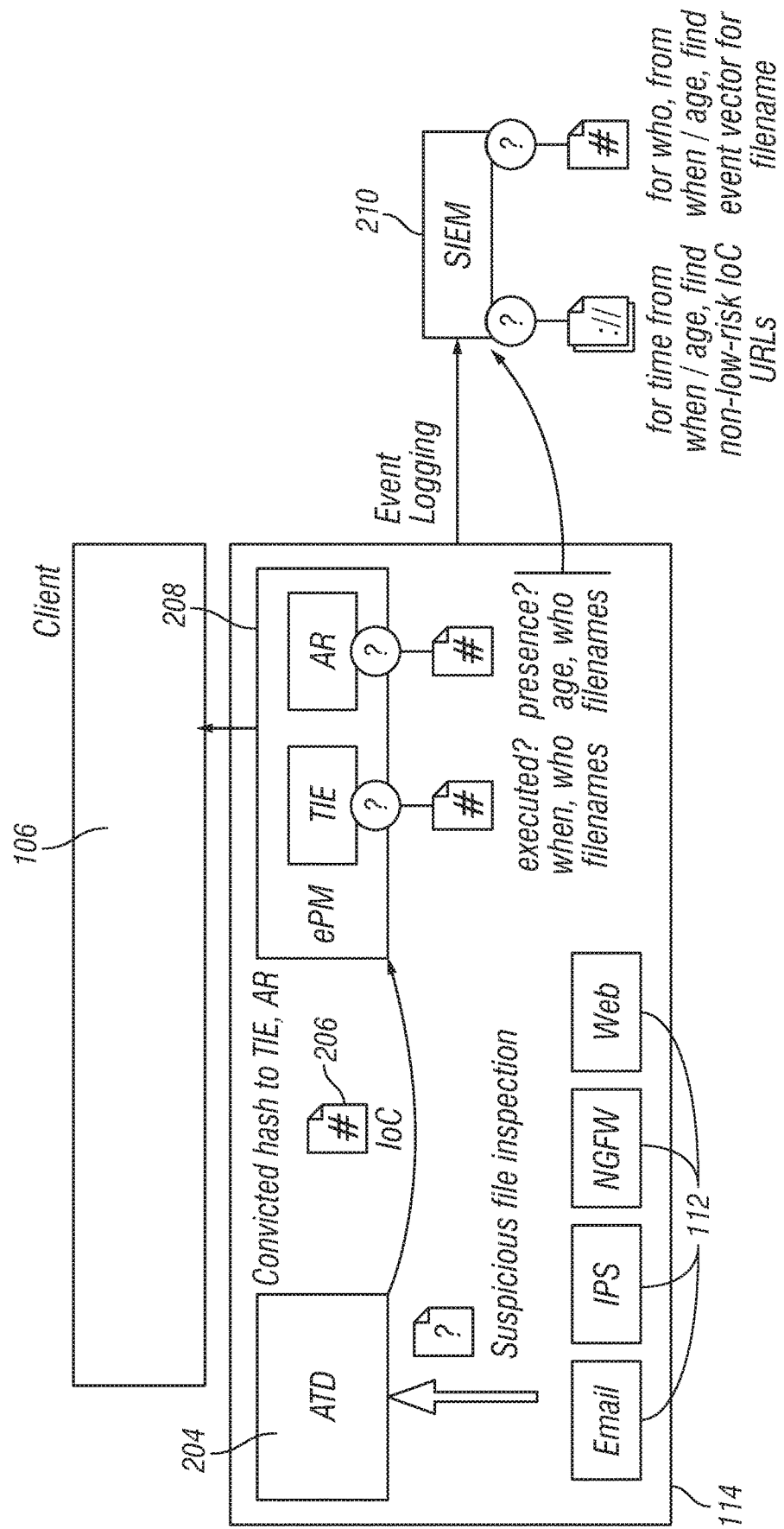
FIG. 5 is an illustration of further operation of the controller, according to embodiments of the present disclosure.

FIG. 5 is an illustration of further operation of controller 114, according to embodiments of the present disclosure. In FIG. 5, a threat or IoC may be identified by security applications 112 such as email scanning, intrusion protection systems, firewalls, or web scanning. These may pass an identified file 206 to advanced threat detection 204 for more analysis. Once file 206 is confirmed as suspicious or malicious, a hash or signature of file 206 may be passed to an EPM software environment 208, which may include TIE or active response. These may query client or endpoints 106 to determine whether file 206 was present therein, on what hosts, was executed, by what hosts, and under what filenames. Furthermore, controller 114 may feed such information into SIEM 210, wherein it may be cross-referenced. Cross-referencing may determine, for a full range of hosts, when the file was encountered, whether URLs were accessed as a result, whether other hosts accessed the same URLs, and other associations for the file.

Figure 6:
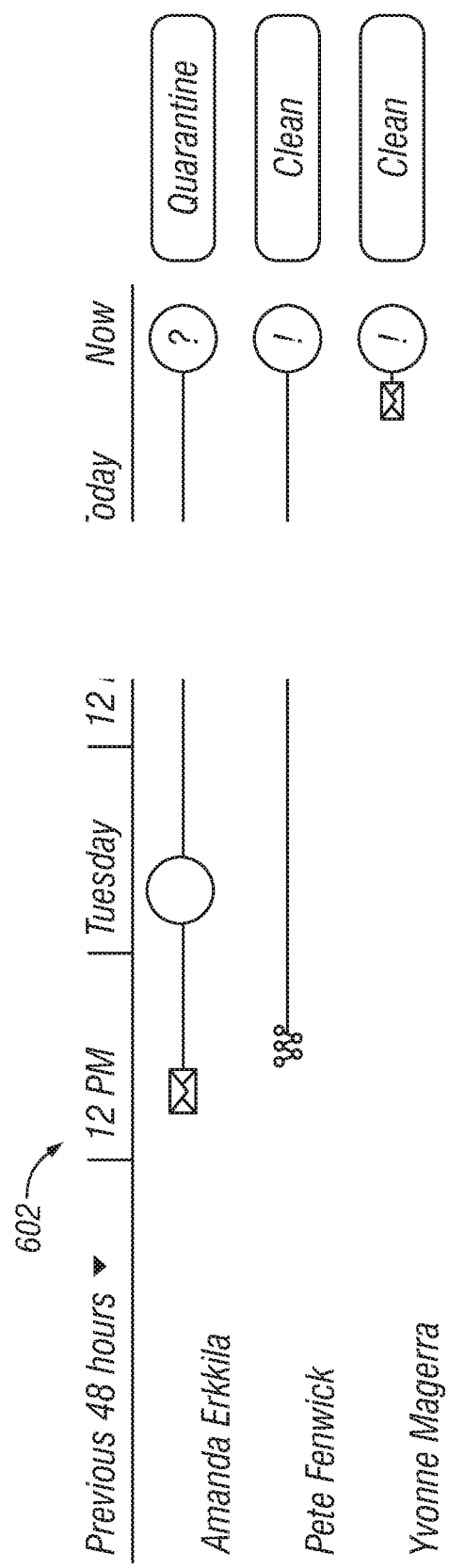
FIG. 6 is a simplified visualization, according to embodiments of the present disclosure.

FIG. 6 is a simplified visualization 602, according to embodiments of the present disclosure. Resource activity may have been removed from other visualizations shown above. However, individual timelines, avenues of attack, presence of the threat, and recommended remedial actions may remain.

Figure 7:
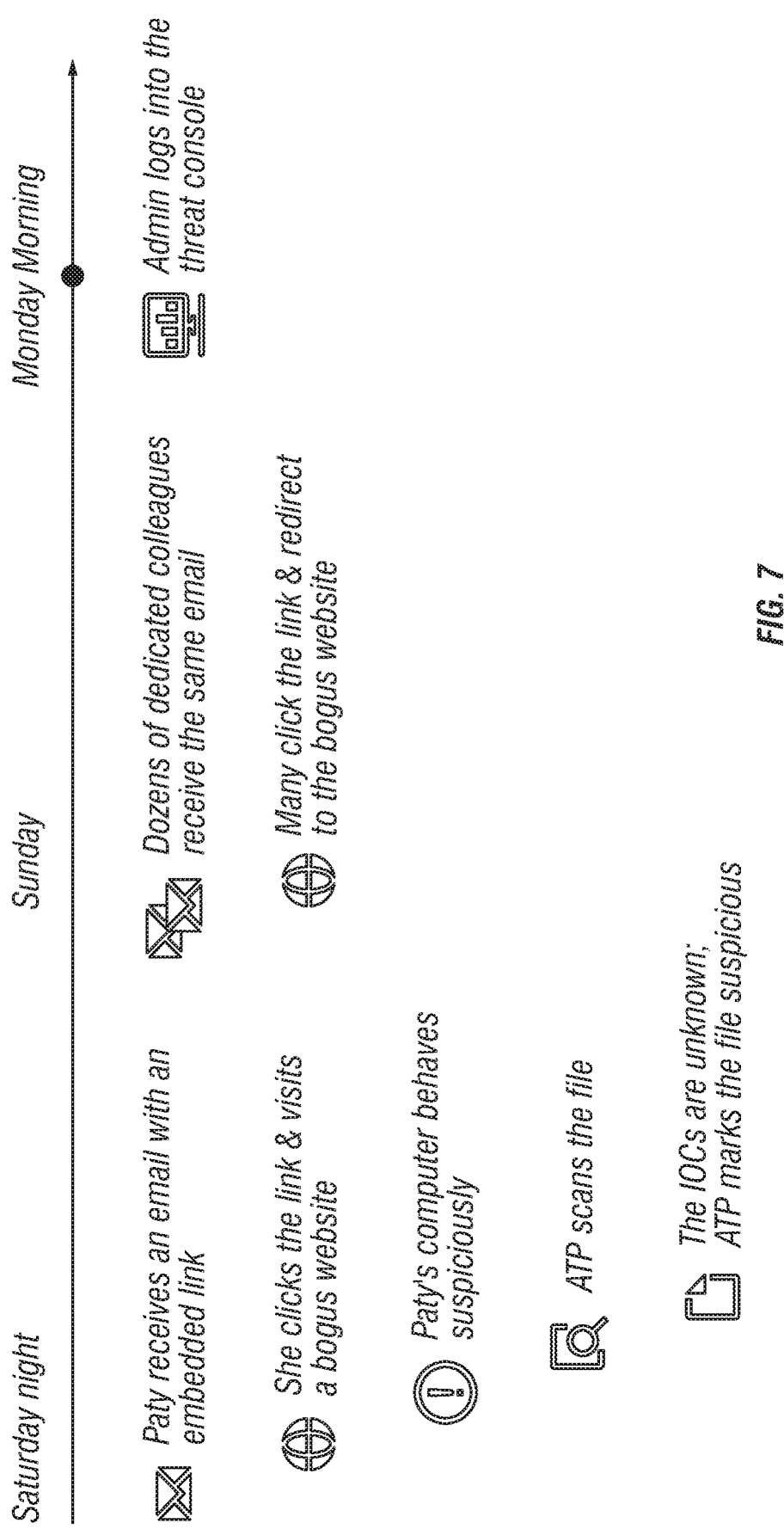
FIG. 7 is an illustration of operation of clients within the system that may be analyzed by the controller, according to embodiments of the present disclosure.

FIG. 7 is an illustration of operation of clients within system 100 that may be analyzed by controller 114, according to embodiments of the present disclosure. A client or a user on a given client may receive an e-mail with an embedded link on a Saturday night. The user might click the link and visit a website that is malicious. The website may, for example, include malware code, corrupted files, be a phishing website, or otherwise be harmful to visit. The user's machine may begin to behave suspiciously. Advanced threat protection applications might scan files on their way to or recently delivered to the clients, finding a file whose which malware status is unknown. The file may be uniquely identified with a hash or signature and marked as suspicious. In some embodiments, it might not yet be known that the website was malicious, or that the visit to the website caused the suspicious behavior. System 100 might only have determined, at such a point in time, that the client is behaving suspiciously and an unknown file has been identified.

On Sunday, dozens of colleagues within the same organization as the user may receive the same e-mail that the user received the previous night. Several such users may click on the link within the e-mail and access the bogus website. In one embodiment, system 100 might not yet have connected this event to any of the previous day's events.

On Monday, an administrator may log in to a central server, such as monitoring server 102. The administrator may utilize controller 114 to cross-reference the activities shown in FIG. 7.

FIGS. 8-18 are illustrations of an example GUI for controller 114, according to embodiments of the present disclosure. Each of FIGS. 8-18 shows various operation of controller 114 through illustrations of GUI screens.

As shown in FIG. 8, a GUI for controller 114 may include any suitable number or kind of elements. First, a search bar 802 may be presented for searching for specific clients, hosts, VMs, users, IoCs, URLs, subnetworks, or other elements of the network. A time frame 804 for searches or display, such as the past 72 hours, may be presented. A present view 806, such as a user whose results are currently being shown, may be identified.

In one embodiment, a display 808 of currently found or unresolved suspicious or malicious files or IoCs may be displayed. For example, three suspicious files might have been reported by clients or found through scanning or query of clients. Other statistics 810 for previous operations, whether for a lifetime or over a defined period of time, may be presented. These may include a number of files or IoCs blocked, passed, number of hosts protected, and number of hosts quarantined. Malware files encountered 812, sources 814 of such malware files, and targets 816 of such malware files may be displayed in independent portions of the GUI. Furthermore, each such portion may be displayed according to historical or present data. Within targets 816, users, hosts, VMs, clients, or other targets may be listed and a first contact with a given file or IoC may be indicated. The resource usage of the target may be shown over a time period window 818, as well as options 820 for remediation. Furthermore, individual incidents or encounters of IoCs may be individually listed at a bottom portion of the GUI is a display 822. Display 822 may show dates, sources, targets, file names, hash values, and current statuses of a given IoC. An individual IoC currently selected from display 822 may be shown in display 824. More details about the individual IoC may be shown therein, such as the has value, a malware assessment, a current status, a time of action (such as blocking) taken, an indicator of a security application or other entity taking the action, when the IoC was first seen, a total number of times the IoC has been seen, a file name, a source, a type of file, a size, a response log, other names used by the IoC, URLs contacted by the IoC, and other activities observed.

FIG. 8 may display results of scanning or other incidents, for example, in the previous 72 hours. This may yield three suspicious files. The three suspicious files may be listed under the "Malware files" list. They may be indicated that they are suspicious, rather than known to be malicious, by use of orange text as opposed to red text. Furthermore, they may be separated from other malicious files in the list that were previously discovered and addressed.

Figure 9:
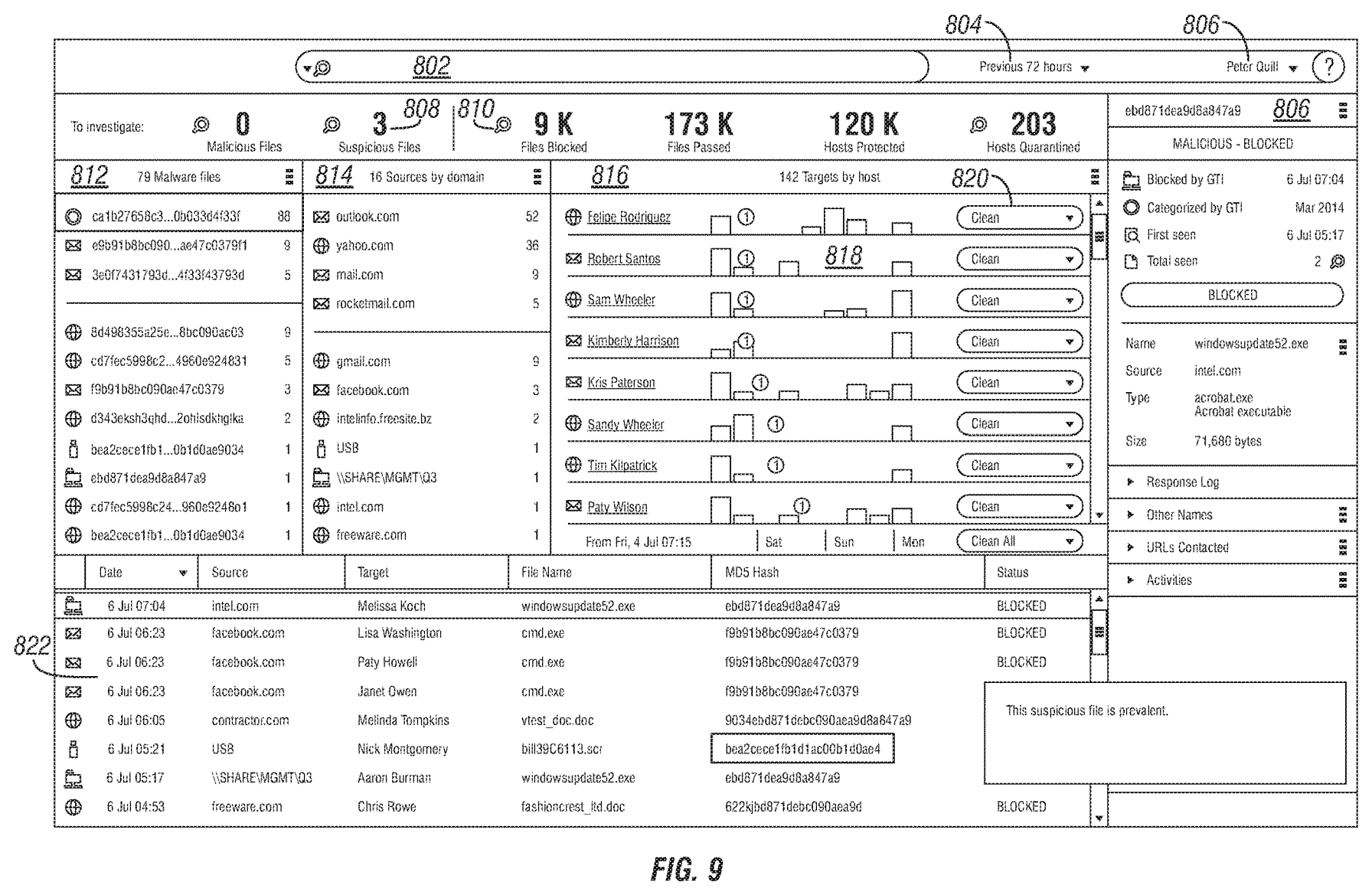

In FIG. 9, one of the newly found suspicious files may be selected. The file's hash or signature may be "ca1b27658c3 . . . 0b033d4f33f". Malware sources encountered 812 may also indicate that this file has been encountered a certain number of times during the relevant time window. In this example, the file has been encountered 88 times.

Under sources list 814, each source of various suspicious files may be listed according to the number of files which the source provided. If a source were selected, rather than the file "ca1b27658c3 . . . 0b033d4f33f", the GUI may be configured to display all the files that were downloaded from the given source in malware sources encountered 812. Moreover, each instance of downloading the file would be displayed in display 822.

Figure 10:
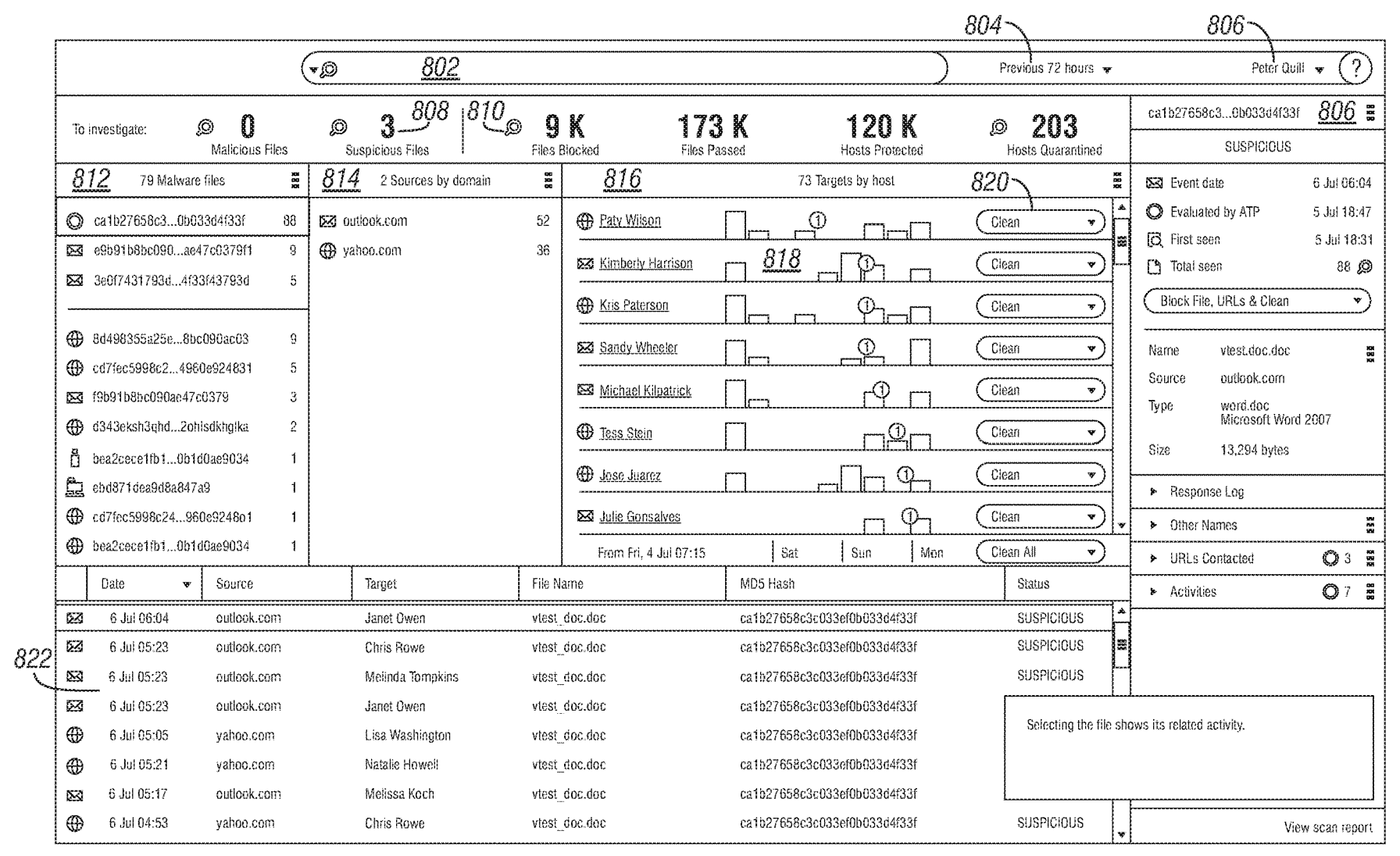

In FIG. 10, the results of selecting the "ca1b27658c3 . . . 0b033d4f33f" file are shown. In sources 814, it may be shown that this file was downloaded 52 times from a first website, and 36 times from a second website by various users of system 100. The file was downloaded by 73 different users or hosts, as shown in targets 816. The time at which a given user downloaded this file is shown on the timeline 818 for the given user or target. Moreover, the avenue or vector by which the file was downloaded or accessed may be shown using an icon. In this example, each of the users shown accessed the file through e-mail or SMTP, denoted by a letter icon next to the user's name. The status of the file is shown on the far right in status 820. The file is noted as suspicious in display 806. A given event date of an instance of the IoC is shown, along with an evaluation date, and a time at which the file first appeared. A total incident rate may also be shown. An option to clean and block all instances of the file and associated URLs may be offered. A filename associated with a given instance of the file, its source, its format, and size may be illustrated.

Figure 11:
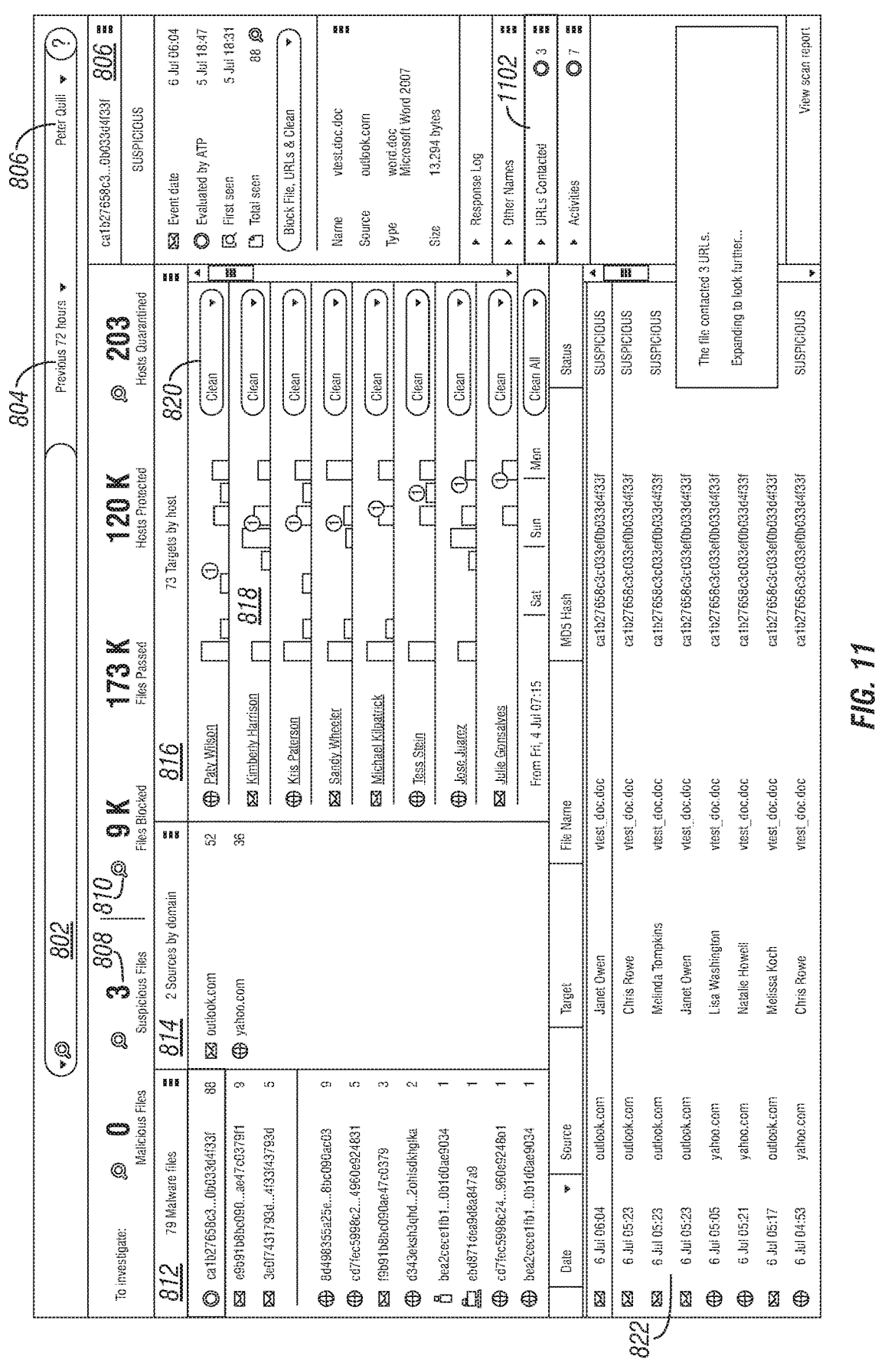
Figure 12:
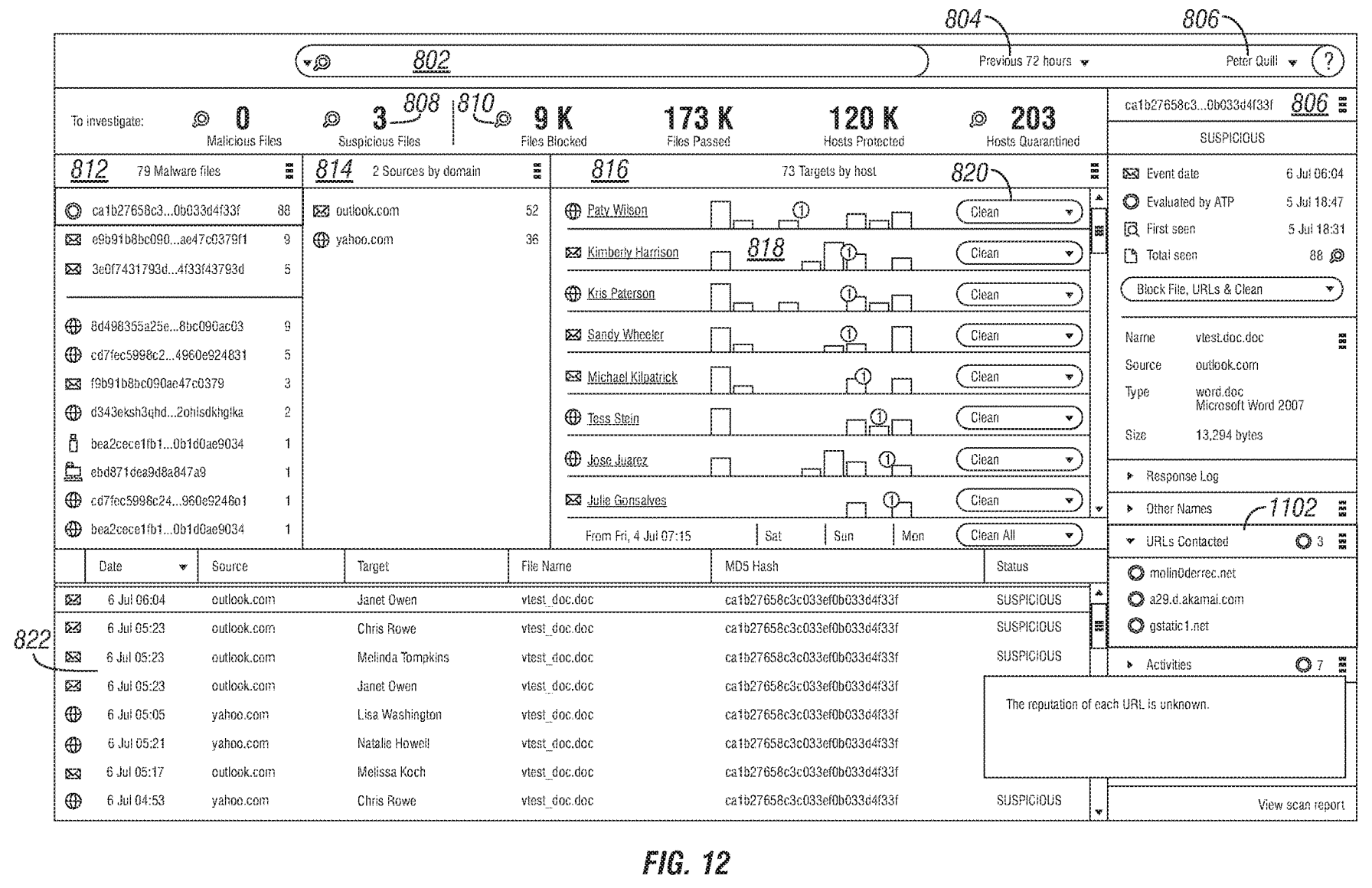

In FIG. 11, it may be shown that the file contacted three URLs by selecting an entry 1102 for URLs contacted. The reputation of these URLs might be unknown, denoted by a gray color. If the reputation of the URLs were known to be good, they could be displayed in green; if suspicious, displayed in orange; and if malicious, displayed in red. Clicking on the URLs may expand the view to show the URLs in FIG. 12.

Figure 13:
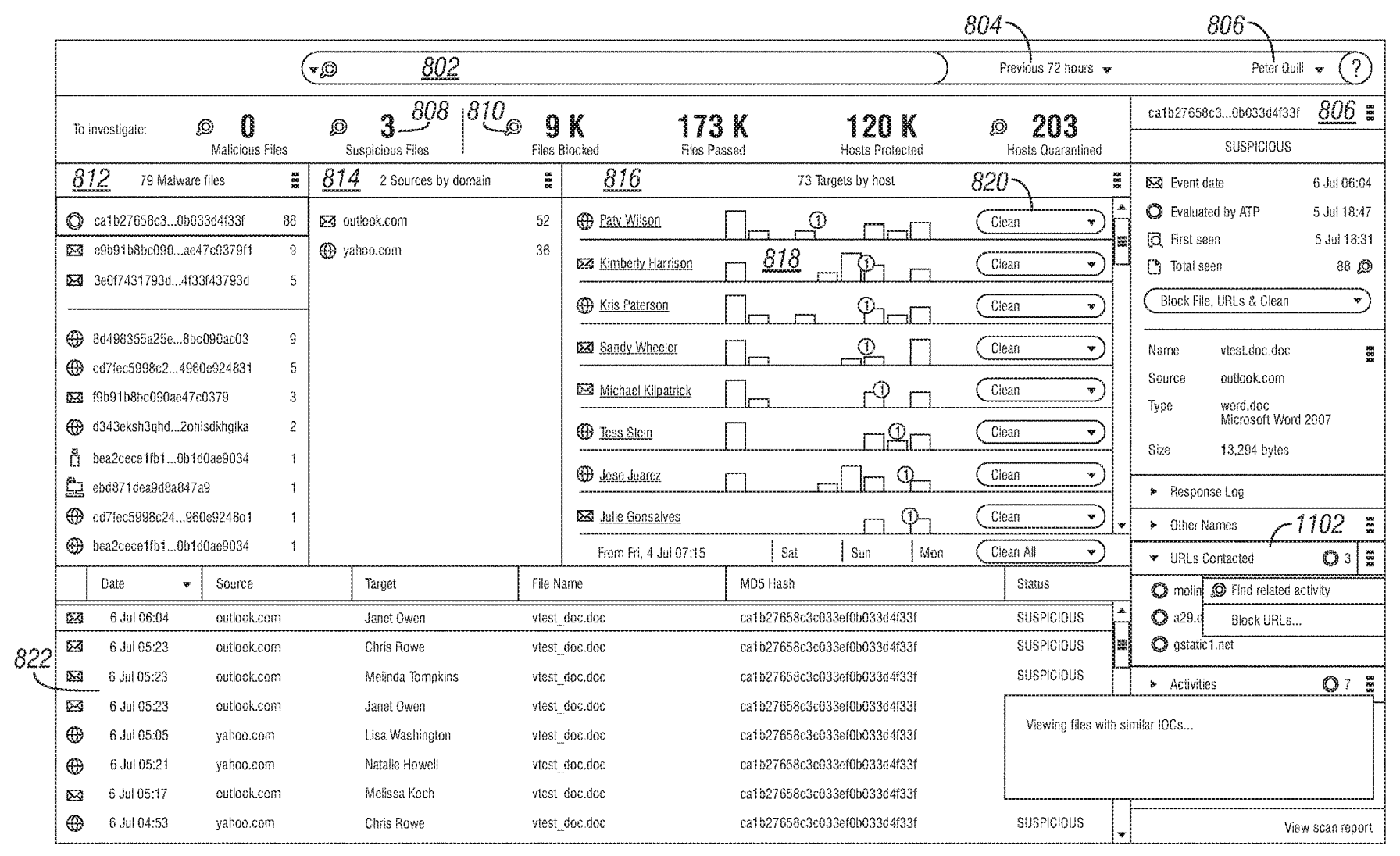
Figure 14:

In FIG. 13, clicking on one of the URLs may allow searching for other files that also accessed the URL or include similar IoCs, as will be shown in FIG. 14.

Figure 16:
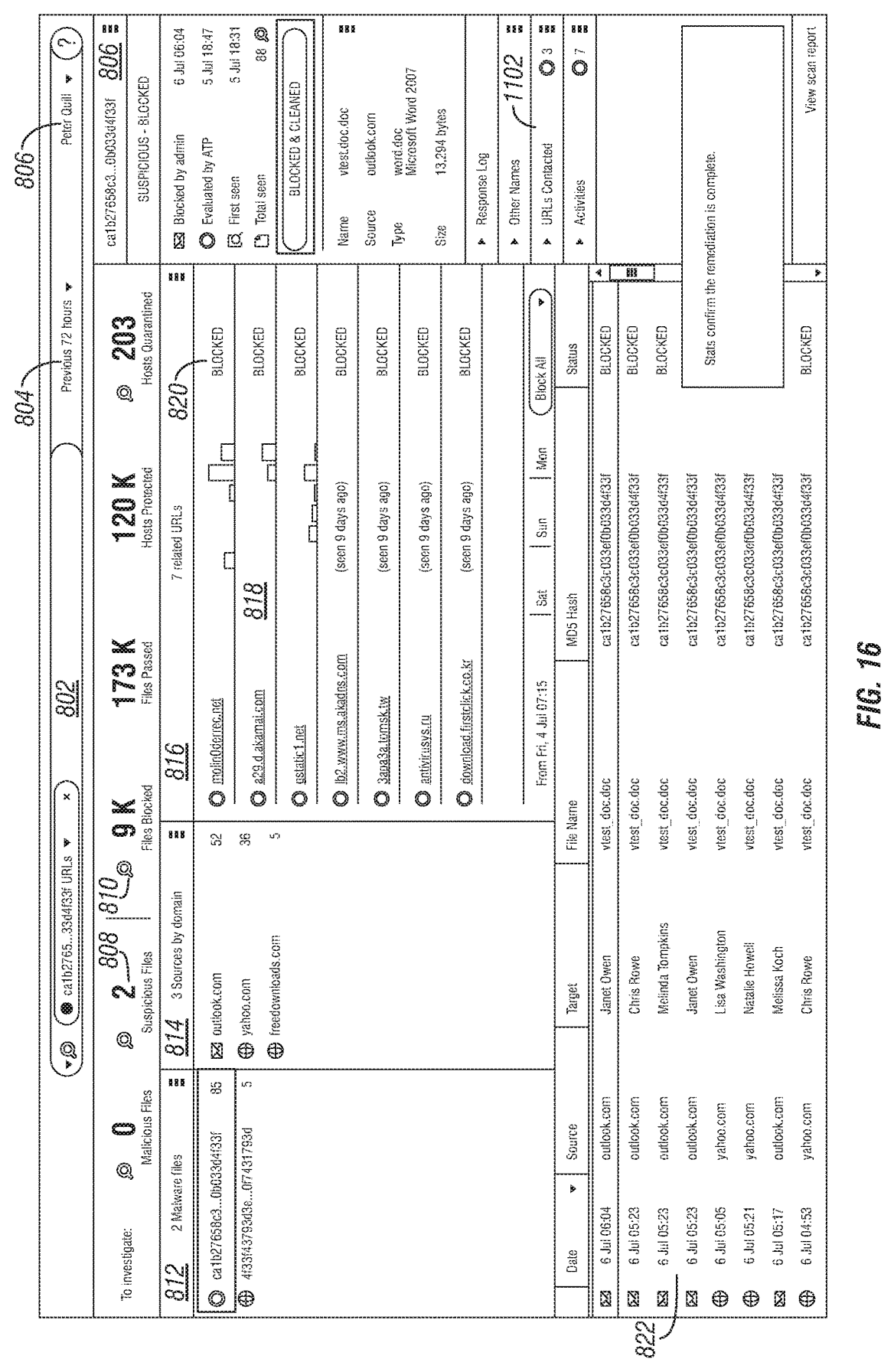

In FIG. 14, another file that accessed the same URL may include a file indicated by a hash or signature value of "4f33f43793d3e . . . 0f7431793d". Sources of the file may be displayed, along with URLs accessed in turn by the file. The file may be determined to be suspicious based upon its shared access of the URL in FIG. 13. The sources may be determined to be malicious or suspicious based upon their production of this new file. The file might have accessed other URLs, displayed in FIG. 14. Access frequency of the URLs by various clients or hosts of system 100 may be displayed on different timelines 818. Some such URLs might have already been blocked. The GUI may provide options 1402 for blocking the URLs that have been presently identified. In FIG. 15, the file and its URLs may be blocked by selecting blocking from options 1402. In FIG. 16, the results of blocking may be shown in display 806. The number of suspicious files may be reduced by one.

Figure 17:
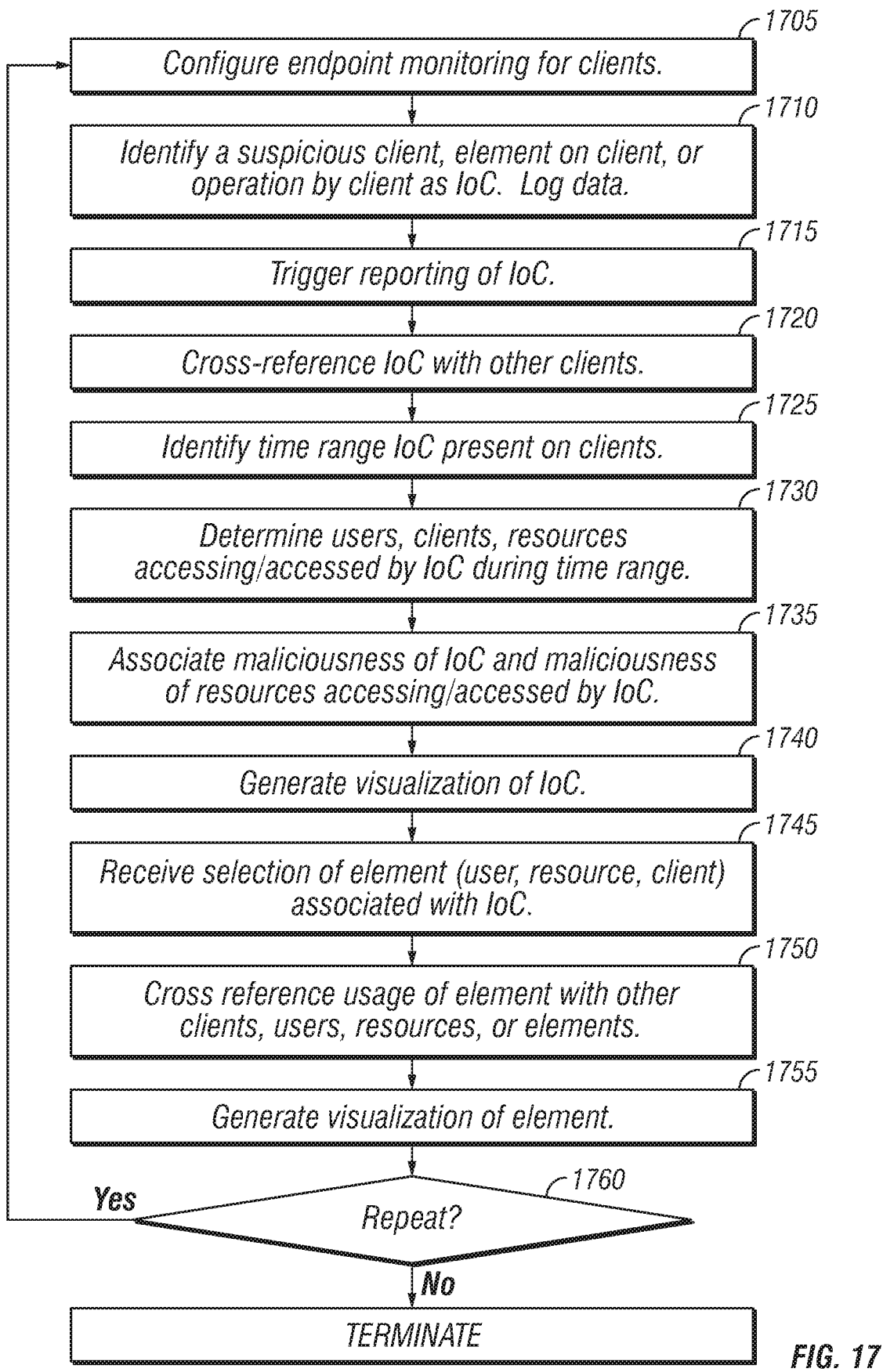
FIG. 17 is an illustration of an example method for cross-product security, according to embodiments of the present disclosure.

FIG. 17 is a flowchart of an example method 1700 for advanced threat protection across products, in accordance with embodiments of the present disclosure. Method 1700 may begin at any suitable point and execute in any similar manner. Method 1700 may be implemented by the elements shown in FIGS. 1-16. Method 1700 may optionally repeat or terminate at suitable points. For example, method 1700 may repeat 1715, 1720-1740, or 1745-1755 at any suitable time or in any suitable order with each other. Multiple instances of method 1700, or portions thereof, may operate recursively or in parallel. For example, 1710 may execute in parallel with 1715-1760. Method 1700 may begin at, for example, 1705.

At 1705, it may be determined that clients, machines, computers, virtual machines, or other endpoints are to be monitored for malicious behavior and content. The actions of these may be logged any they may be periodically scanned. At 1710, such endpoints may be monitored and an IoC may be identified. The IoC may include content, a client itself, an element of the client, or an operation of the client. The IoC and the associated information, such as file, source, target, time, hash values, or other suitable information may be logged. 1705 and 1710 may repeat as necessary and in parallel with each other and other steps of method 1700. Other information, such as the general contents or activities, may be logged. Such data may be logged even if no IoC is identified, as an IoC may be identified in another client and cross-referenced with equivalent information in the present client.

At 1715, reporting of the IoC may be triggered. Such reporting may be triggered, for example, if the IoC is exceptionally dangerous, upon a designated time frame or schedule, or on-demand from a user of a security controller. 1715 may repeat as necessary and in parallel with other steps of method 1700.

At 1720, the IoC may be analyzed. The IoC may be cross-referenced using its information with information from other clients. At 1725, a time range for the IoC across multiple clients may be logged. At 1730, users, clients, resources accessing the IoC or accessed by the IoC during the time range may be determined from logged data. At

1735, the maliciousness of the IoC and the maliciousness of resources accessing the IoC or accessed by the IoC may be joined, merged, combined, or otherwise reconciled. At 1740, a visualization of the IoC and the cross-referenced data may be generated and presented. 1720-1740 may repeat as necessary and in parallel with other steps of method 1700.

At 1745, a selection of one of the elements of the visualization may be received. At 1750, the element may be cross-referenced with other clients, users, resources, or elements. For example, a URL accessed by a file tagged as an IoC may be selected. As a result, other clients or files accessing the URL may be cross-referenced and displayed. At 1755, a resulting visualization of the element as cross-referenced may be generated. 1745-1755 may repeat as necessary and in parallel with other steps of method 1700.

At 1760, method 1700 may optionally repeat (at 1705 or another suitable step) or terminate.

The execution of the system may be implemented in any suitable number and kind of methods. The methods may begin at any suitable point, may repeat, and may reference each other. The methods may be implemented fully or in part by instructions on computer-readable media for execution by a processor. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

The following examples pertain to further embodiments. Specifics in the examples may be used anywhere in one or more embodiments described above or herein.

Embodiments of the present disclosure include at least one non-transitory machine readable storage medium. The medium may include computer-executable instructions. The instructions may be readable by a processor. The instructions, when read and executed, may cause the processor to determine a suspicious file from a first client, identify whether the suspicious file has been encountered by one or more second clients, calculate a time range for which the suspicious file has been present on the first and second clients, determine resources accessed by the suspicious file during the time range, and create a visualization of the suspicious file, a relationship between the suspicious file and the first and second clients, the time range, and the resources accessed by the suspicious file during the time range. In combination with any of the above embodiments, the processor may be further caused to cross-reference an Indicator of Compromise (IoC) accessed by the suspicious file with IoCs accessed by other files. In combination with any of the above embodiments, the processor may be further caused to determine a second file that accessed a same IoC as the suspicious file. In combination with any of the above embodiments, the processor may be further caused to categorize the second file as suspicious based upon its access of the same IoC as the suspicious file. In combination with any of the above embodiments, the processor may be further caused to identify a source of the second file. In combination with any of the above embodiments, the processor may be further caused to categorize the source as suspicious based upon its production of the second file and upon the second file's access of the same IoC as the suspicious file. In combination with any of the above embodiments, the processor may be further caused to display a source of the suspicious file within the visualization. In combination with any of the above embodiments, the client includes a user, client electronic device, or a virtual machine.

Embodiments of the present disclosure include a system for securing electronic device. The system may include a processor, at least one non-transitory machine readable storage medium communicatively coupled to the processor, a plurality of security applications, and a security controller. The security controller may include computer-executable instructions on the medium, the instructions readable by the processor to configure the security application. The security application may be configured to determine a suspicious file from a first client, identify whether the suspicious file has been encountered by one or more second clients, calculate a time range for which the suspicious file has been present on the first and second clients, determine resources accessed by the suspicious file during the time range, and create a visualization of the suspicious file, a relationship between the suspicious file and the first and second clients, the time range, and the resources accessed by the suspicious file during the time range. In combination with any of the above embodiments, the security application may be further configured to cross-reference an Indicator of Compromise (IoC) accessed by the suspicious file with IoCs accessed by other files. In combination with any of the above embodiments, the security application may be further configured to determine a second file that accessed a same IoC as the suspicious file. In combination with any of the above embodiments, the security application may be further configured to categorize the second file as suspicious based upon its access of the same IoC as the suspicious file. In combination with any of the above embodiments, the security application may be further configured to identify a source of the second file. In combination with any of the above embodiments, the security application may be further configured to categorize the source as suspicious based upon its production of the second file and upon the second file's access of the same IoC as the suspicious file. In combination with any of the above embodiments, the security application may be further configured to display a source of the suspicious file within the visualization. In combination with any of the above embodiments, the client includes a user, client electronic device, or a virtual machine.

Embodiments of the present disclosure may include an apparatus. The apparatus may include means for determining a suspicious file from a first client, means for identifying whether the suspicious file has been encountered by one or more second clients, means for calculating a time range for which the suspicious file has been present on the first and second clients, means for determining resources accessed by the suspicious file during the time range, and means for creating a visualization of the suspicious file, a relationship between the suspicious file and the first and second clients, the time range, and the resources accessed by the suspicious file during the time range. In combination with any of the above embodiments, the apparatus may further include means for cross-referencing an Indicator of Compromise (IoC) accessed by the suspicious file with IoCs accessed by other files. In combination with any of the above embodiments, the apparatus may further include means for determining a second file that accessed a same IoC as the suspicious file. In combination with any of the above embodiments, the apparatus may further include means for categorizing the second file as suspicious based upon its access of the same IoC as the suspicious file. In combination with any of the above embodiments, the apparatus may further include means for identifying a source of the second file. In combination with any of the above embodiments, the apparatus may further include means for categorizing the source as suspicious based upon its production of the second file and upon the second file's access of the same IoC as the suspicious file. In combination with any of the above embodiments, the apparatus may further include means for displaying a source of the suspicious file within the visualization. In combination with any of the above embodiments, the apparatus may further include means for displaying a security application that identified the suspicious file within the visualization. In combination with any of the above embodiments, the client may include a user, client electronic device, or a virtual machine.

Embodiments of the present disclosure may include a method of electronic security. The method may include determining a suspicious file from a first client, identifying whether the suspicious file has been encountered by one or more second clients, calculating a time range for which the suspicious file has been present on the first and second clients, determining resources accessed by the suspicious file during the time range, and creating a visualization of the suspicious file, a relationship between the suspicious file and the first and second clients, the time range, and the resources accessed by the suspicious file during the time range. In combination with any of the above embodiments, the method may further include cross-referencing an Indicator of Compromise (IoC) accessed by the suspicious file with IoCs accessed by other files. In combination with any of the above embodiments, the method may further include determining a second file that accessed a same IoC as the suspicious file. In combination with any of the above embodiments, the method may further include categorizing the second file as suspicious based upon its access of the same IoC as the suspicious file. In combination with any of the above embodiments, the method may further include identifying a source of the second file. In combination with any of the above embodiments, the method may further include categorizing the source as suspicious based upon its production of the second file and upon the second file's access of the same IoC as the suspicious file. In combination with any of the above embodiments, the method may further include displaying a source of the suspicious file within the visualization. In combination with any of the above embodiments, the method may further include displaying a security application that identified the suspicious file within the visualization. In combination with any of the above embodiments, the client may include a user, client electronic device, or a virtual machine.

Although the forgoing has been described with respect to various embodiments, additions, variations, substitutions, and deletions may be made to the embodiments without departing from the scope and intent of the present disclosure.

What is claimed is:

1. At least one non-transitory machine-readable storage medium, comprising computer-executable instructions carried on the machine readable medium, the instructions readable by a hardware processor, the instructions, when read and executed, for causing the hardware processor to:
   identify a file;
   determine at least one uniform resource locator (URL) contacted by the file;
   search for at least one other file that contacted the at least one URL;
   determine that the file is suspicious based on both the file and the at least one other file having contacted the at least one URL;
   display information regarding the at least one URL contacted by the file;
   receive an indication that a user wants to block the file from contacting the at least on URL; and
   block the file from contacting the at least one URL.

2. The non-transitory machine-readable storage medium of claim 1, wherein the information is a reputation of the at least one URL.

3. The non-transitory machine-readable storage medium of claim 1, wherein the instructions, when read and executed, also cause the hardware processor to display a source of the file.

4. The non-transitory machine-readable storage medium of claim 1, wherein the instructions, when read and executed, also cause the hardware processor to display a frequency at which the at least one URL was accessed over a plurality of time periods.

5. A system comprising:
   a memory;
   a hardware processor coupled to the memory and configured to:
   identify a file;
   determine at least one uniform resource locator (URL) contacted by the file;
   search for at least one other file that contacted the at least one URL;
   determine that the file is suspicious based on both the file and the at least one other file having contacted the at least one URL;
   display information regarding the at least one URL contacted by the file;
   receive an indication that a user wants to block the file from contacting the at least on URL; and
   block the file from contacting the at least one URL.

6. The system of claim 5, wherein the information is a reputation of the at least one URL.

7. The system of claim 5, wherein the hardware processor is also configured to display a source of the file.

8. The system of claim 7, wherein the hardware processor is also configured to determine that the source of the file is suspicious.

9. The system of claim 5, wherein the hardware processor is also configured to display a frequency at which the at least one URL was accessed over a plurality of time periods.

10. A method comprising:
    identifying a file;
    determining at least one uniform resource locator (URL) contacted by the file using a hardware processor;
    search for at least one other file that contacted the at least one URL;
    determine that the file is suspicious based on both the file and the at least one other file having contacted the at least one URL;
    displaying information regarding the at least one URL contacted by the file;
    receiving an indication that a user wants to block the file from contacting the at least on URL; and
    blocking the file from contacting the at least one URL.

11. The method of claim 10, wherein the information is a reputation of the at least one URL.

12. The method of claim 10, further comprising displaying a source of the file.

13. The method of claim 12, further comprising determining that the source of the file is suspicious.

14. The method of claim 10, further comprising displaying a frequency at which the at least one URL was accessed over a plurality of time periods.

\* \* \* \* \*

UNITED STATES PATENT AND TRADEMARK OFFICE
CERTIFICATE OF CORRECTION

PATENT NO. : 10,769,276 B2
APPLICATION NO. : 16/133485
DATED : September 8, 2020
INVENTOR(S) : Derek Pearcy et al.

Page 1 of 1

It is certified that error appears in the above-identified patent and that said Letters Patent is hereby corrected as shown below:

In the Claims

Column 14 Line 7 Claim 1, "from contacting the at least on URL" should be --from contacting the at least one URL--.

Column 14 Line 36 Claim 5, "from contacting the at least on URL" should be --from contacting the at least one URL--.

Column 14 Line 60 Claim 10, "from contacting the at least on URL" should be --from contacting the at least one URL--.

Signed and Sealed this
Fifth Day of January, 2021

Andrei Iancu
*Director of the United States Patent and Trademark Office*